United States Patent Office 2,973,774
Patented Mar. 7, 1961

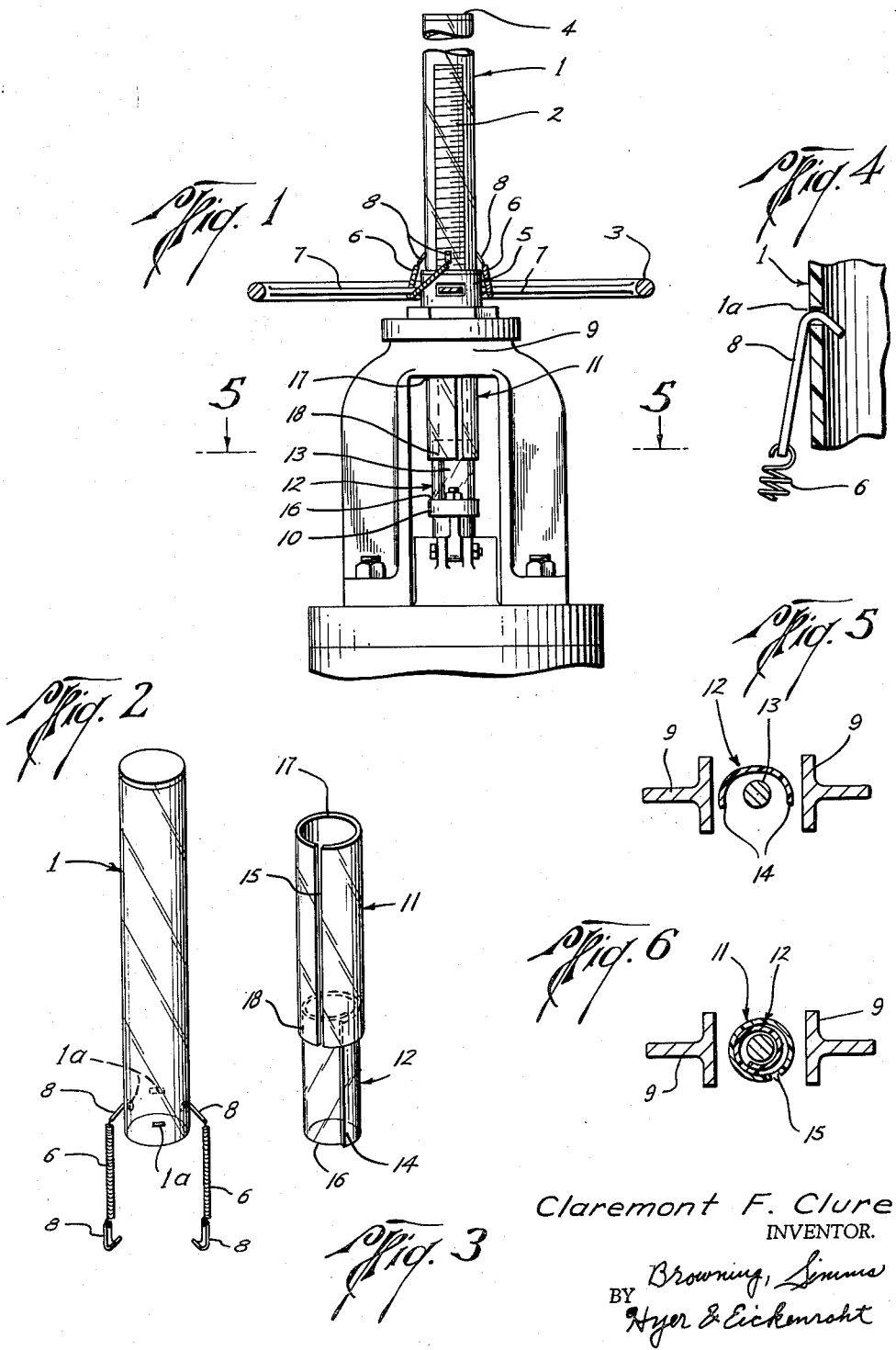

2,973,774

TRANSPARENT SHIELD FOR GATE VALVE STEMS

Claremont F. Clure, P.O. Box 1403, Shreveport, La.

Filed Jan. 15, 1958, Ser. No. 709,141

5 Claims. (Cl. 137—382)

This invention relates to a valve stem shield for rising stem gate valves and relates more particularly to transparent valve stem shields.

Rising stem gate valves are used in great quantities in pipelines, refineries, chemical plants and in other allied industries. In this type of valve, the threaded stem is exposed above the handwheel and the polished part of the stem is exposed between the packing gland and the yoke.

This exposure of the stem is an asset in several respects. It allows visual observation of the stem to determine the condition of the threads. Another reason is that the operator can judge from the amount of stem extending above the handwheel if the valve is opened or closed.

Where the valves are exposed to the weather, dust and escaping industrial products, the threads can become covered with ice, dust or they can become fouled with corrosion. These conditions can prevent operation of the valve. To avoid these difficulties, the threaded stem can be covered with grease or a like material. This is only a temporary remedy to the problem as climatic conditions and operation of the valve remove the protective coating.

It has been proposed to bolt a metal covering to the valve which does protect it from the above undesired conditions. The metal covering is difficult to install and remove besides preventing visual observation of the stem and simple maintenance.

The present invention is a device which protects the threaded stem above the handwheel and also the polished portion of the stem above the packing gland and below the yoke. The device allows ready visual inspection of the stem. It is easily installed and removed besides being readily adjustable when maintenance of the valve packing gland becomes necessary. The device is not subject to corrosion, moisture, heat and cold, nor to damage in accidental displacements through impacts. When installed the inherent advantages of the rising stem valve are preserved.

It is therefore an object of the present invention to provide a novel transparent valve stem shield to protect the exposed stems on rising stem gate valves.

Another object is to provide a transparent valve stem shield that protects the exposed valve stem from external elements and allows visual inspection of the valve stem as to its condition and its position.

An additional object is to provide a transparent valve stem shield that is readily attachable and removable.

Still another object is to provide a transparent valve stem shield that is not subject to deterioration through corrosion, moisture, heat and cold.

Yet another object is to provide a transparent valve stem shield that aids in retaining the lubricants on the valve stem.

A further object is to provide a transparent valve stem shield which is securely held in place but not damaged through accidental displacement.

Still another object is to provide in a transparent valve stem shield means to maintain protection of the polished valve stem after adjustment of the packing gland.

These and other objects will become more apparent when read in conjunction with the following detailed description and the attached drawings of a preferred and illustrative embodiment of the invention, wherein:

Fig. 1 is a partial elevational view of a rising stem gate valve with the transparent valve stem shields of this invention in place;

Fig. 2 is a perspective view of the transparent valve stem shield for the threaded portion of the valve stem;

Fig. 3 is a perspective view of the transparent valve stem shield for the polished portion of the valve stem;

Fig. 4 is a longitudinal sectional view of the lower section of the thread stem shield showing an attaching clip in place;

Fig. 5 is a cross-sectional view through the polished stem portion of the valve taken along the line 5—5 in Fig. 1, showing the inner concentric section opened to be placed around the valve stem; and Fig. 6 is a cross-sectional view through the polished stem portion of the valve taken along the line 5—5 in Fig. 1, and showing the relationship of the inner and outer concentric sections.

Turning now to Fig. 1, a detailed description of a preferred embodiment of the present invention will be given. In Fig. 1 a partial view of a rising stem gate valve is shown. The pertinent parts are the yoke 9, the handwheel 3 with spokes 7 extending from the handwheel hub 5, the packing gland 10, the polished portion 13 and the threaded portion 2 of the valve stem. The transparent valve stem shields for protecting the threaded portion 2 and the polished portion 13 of the valve stem are shown in place.

The transparent valve stem sheld 1 used to protect the threaded portion 2 of the valve stem is releasably secured to the handwheel 3. The shield 1 is of sufficient internal diameter to freely pass over the threaded portion 2 of the valve stem and has sufficient length that the threaded portion 2 of the valve stem in fully extended position can be received within shield 1 without displacing it. The upper end of shield 1 is sealed against the weather by means of closure 4. The lower end of shield 1 is secured tightly and releasably against the handwheel hub 5 by spring means attached to shield 1 and passing beneath the spokes 7 of the handwheel 3.

A preferred means for releasably securing the upper shield member 1 on the gate valve is illustrated in Fig. 4. The use of springs 6 as a means of holding shield 1 in place allows the shield 1 to be displaced by accidental blows without damage to it. As can be seen in Fig. 2, the spring means comprises a pair of springs 6 having metal clips 8 attached to their ends.

These metal clips 8, as clearly seen in Fig. 4, have a hole in one end where the spring 6 can be attached. At the opposite end there is formed a hook which is receivable within slots 1a in shield 1.

There are four slots 1a equally spaced around the circumference of shield 1. They are at such a distance from the open end of shield 1 that when the spring 6 is passed beneath the spoke 7 and the metal clips 8 are placed into slots 1a, the shield 1 will be securely held in place.

Thus, to secure shield 1 to a rising stem gate valve, shield 1 is placed over the threaded portion 2 of the valve stem. Next, the springs with the metal clips 8 attached are passed beneath opposite spokes 7 of the handwheel 3. Finally, the metal clips 8 are hooked into their respective slots 1a. The shield will then be securely held in place as shown in Fig. 1.

Shield 1 may be removed by unhooking one of the metal clips 8 on each of springs 6. Then, shield 1 can be lifted from the valve.

The springs 6 and metal clips 8 are preferably made of stainless steel for long service.

The transparent valve stem shield which protects the polished portion 13 of the valve stem is shown in Fig. 1. A preferred means for releasably securing the lower shield member around the polished stem 13 and holding section 11 and section 12 in telescoped relationship is shown in Fig. 3. It is comprised of two concentric sections 11 and 12 in telescoping relationship and encloses polished portion 13 of the valve stem between the packing gland 10 and the yoke 9. The sections 11 and 12 are of a similar diameter and of such dimension as to freely enclose the valve stem. Each section is of such length that the sum of the lengths exceeds the length of the stem to be protected.

As clearly seen in Fig. 3, both section 11 and 12 are split along their longitudinal axes. Section 11 has the resultant edges 15 closely adjacent one another and urged toward abutment. Section 12 has the resultant edges 14 overlapping so that it is of a smaller diameter than section 11 and will therefore slide within section 11.

There is a tendency for section 12 to reduce the amount of overlap of edges 14 by increasing its diameter; that is, to uncurl. Section 11 tends to hold its edges 15 in abutment. When section 12 is disposed within section 11, the former presses outwardly, the latter presses inwardly at 18. As a result of this frictional engagement, section 12 is securely held by section 11. Yet, when desired, they may be telescoped to change the overall length of sections 11 and 12. Then, whenever the packing gland 10 is adjusted, sections 11 and 12 may be telescoped to maintain enclosure of the polished portion 13 of the valve stem. Another feature is that accidental blows will displace the shield but not damage it.

The shield for the polished portion 13 of the valve stem is easily installed as shown in Figs. 5 and 6. As seen in Fig. 5, section 12 is first opened and placed around the polished portion 13 of the valve stem. When section 12 is released, it rests on packing gland 10 and its edges 14 are overlapped. Section 11 is then opened and placed over part of section 12. On releasing section 11, the edges 15 tend to abut. The two sections 11 and 12 are then telescoped to cover the entire exposed polished portion 13 of the valve stem. The lower edge 16 of section 12 rests tightly upon the packing gland 10. The upper edge 17 of section 11 rests tightly under the yoke 9. The sections may be reversed so that section 12 is above section 11. Thus the edge 16 will rest tightly under yoke 9 and the edge 17 will rest tightly upon the packing gland 10. The portion of section 11 which extends over section 12 is shown by numeral 18 in Fig. 2. As previously explained, the friction between the concentric telescoping sections provides the holding force keeping the two sections in place.

Thus, we see that each section completely encloses a part of the polished portion 13 of the valve stem and the enclosing of section 12 by section 11 at numeral 18 provides the frictional force which holds the shield in place.

It is suggested that these shields be made of a heavy, transparent plastic resistant to heat, cold and shock.

In normal operations, both shields are held securely in place. Either can be easily removed by reversal of the installation procedure. Neither is subject to damage through accidental blows, and after displacement they are readily placed back into their original positions.

Obviously either may be employed alone but the total protection for the exposed portions of the valve stem in the type of valve illustrated can only be secured by the use of both shields. The shields may be marketed separately or in a kit including both shields for providing such total protection.

It will be readily appreciated from the foregoing descriptions that there are herein provided novel inexpensive shields for protecting the stems of rising stem gate valves.

As these shields are transparent, all the advantages inherent in this type of valve are retained, yet the valve stem is protected against external influences which damage the valve.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. In combination with a rising stem valve having a valve operating mechanism having a part adapted to be embraced by a shield anchor means and a stem portion projecting outwardly therefrom, the improvement which comprises a shield enclosing the exposed stem portion and including a transparent tubular member in surrounding relationship to said stem portion, a closure over one end of said tubular member and secured to said member to effect a weatherproof seal, and means near the open end of said tubular member for releasably securing said member in position to receive the valve stem, said latter means comprising a flexible elongated resilient member having a first point of its length secured to said tubular member, having an intermediate portion passing around said part on the valve operating mechanism, and releasably secured at a second point of its length beyond said intermediate portion to said tubular member.

2. In combination with a rising stem valve having a valve body and a valve operating mechanism and a valve stem exposed between the body and said mechanism, the improvement which comprises a shield enclosing the exposed valve stem including a transparent tubular member in surrounding relationship to said stem, said member having concentric resilient sections in telescopic relationship to each other, said sections being split lengthwise and of too near the same diameter to be telescoped when both are unstressed and at least one of the sections having the edges at the spilt residing in overlapping relationship, said latter section being an inside section, the friction of the telescoping sections on each other providing a means for releasably securing said section in relative position to enclose the length of the exposed valve stem.

3. In combination with a rising stem valve having a valve body and a valve operating mechanism and a valve stem having a threaded and a polished portion exposed, the polished portion exposed between the body and said mechanism and the threaded portion extending outwardly from said mechanism, the improvement which comprises shields enclosing the exposed valve stem portions including a transparent tubular member in surrounding relationship to the threaded portion of said stem, a closure over one end of said member and secured to said member to effect a weatherproof seal, and means near the open end of the member for releasably securing said member in position to receive the threaded portion of said stem, said last mentioned means comprising a plurality of anchor means on said member, resilient means secured to the anchor means and extending from the anchor means to and around a part of the valve operating mechanism and back to the anchor means, a second transparent tubular member in surrounding relationship to the exposed polished portion of the valve stem, said second member having concentric resilient sections in telescopic relationship to each other and of too near the same diameter to be telescoped when both are unstressed, one of said concentric sections being split lengthwise and having its resultant edges closely adjacent one another, the friction of the telescoping sections on each other providing a means for releasably securing said sections in relative position to enclose the length of the polished portion of said valve stem.

4. In combination with a rising stem valve having a valve body and a valve operating mechanism and a valve stem exposed between the body and said mechanism, the improvement which comprises a shield enclosing the exposed stem including a transparent tubular member in surrounding relationship to said stem, said member having concentric resilient sections in telescoping relationship to each other, said concentric sections being split lengthwise, one of said sections having the resultant edges in overlapping relationship and of too near the diameter of the other to be telescoped with each other when both are unstressed and adapted to be opened and placed around the valve stem, a second of the concentric sections having the resultant edges in abutment and adapted to be opened and placed around said one concentric section, the friction between the sections holding the sections in relative position to enclose the length of valve stem.

5. In combination with a rising stem valve having a valve body and a valve operating mechanism and a valve stem having a polished and a threaded portion exposed, the polished portion exposed between the body and said mechanism and the threaded portion extending outwardly from said mechanism, the improvement comprising shields enclosing the exposed valve stem portions including a transparent tubular member in surrounding relationship to the threaded portion of said stem, a closure over one end of said member and secured to said member to effect a weatherproof seal, and means near the open end of the member for releasably securing said member in position to receive the threaded portion of the stem, said last-mentioned means comprising a plurality of anchor means on said member, resilient means secured to the anchor means and extending from the anchor means to and around a part of the valve operating mechanism and back to the anchor means, a second tubular member in surrounding relationship to the polished portion of the stem, said second member having concentric sections in telescopic relationship to each other and of too near the same diameter to be telescoped with each other when both are unstressed, said concentric sections being resilient and split lengthwise, one of said concentric sections having the resultant edges in overlapping relationship and adapted to be opened and placed around the polished portion of said stem, a second of the concentric sections having the resultant edges in abutment and adapted to be opened and placed around said one concentric sections the friction between the sections holding the sections in relative position to enclose the length of the exposed polished portion of the stem.

References Cited in the file of this patent
UNITED STATES PATENTS

| | | |
|---|---|---|
| 1,266,246 | Fulton | May 14, 1918 |
| 1,664,694 | Lovvorn | Apr. 3, 1928 |
| 1,692,067 | Welsh | Nov. 20, 1928 |
| 2,578,629 | Hartman | Dec. 11, 1951 |
| 2,578,630 | Hartman | Dec. 11, 1951 |